United States Patent
Alahyari (10) Patent No.: US 11,306,947 B2
(45) Date of Patent: Apr. 19, 2022

(54) TEMPERATURE CONTROL SYSTEM IN A PASSENGER SERVICE UNIT

(71) Applicant: B/E Aerospace, Inc., Winston-Salem, NC (US)

(72) Inventor: Abbas A. Alahyari, Glastonbury, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 174 days.

(21) Appl. No.: 16/741,360

(22) Filed: Jan. 13, 2020

(65) Prior Publication Data
US 2021/0215399 A1   Jul. 15, 2021

(51) Int. Cl.
| F25B 9/04 | (2006.01) |
| B60H 1/00 | (2006.01) |
| B64D 13/02 | (2006.01) |
| B64D 13/00 | (2006.01) |

(52) U.S. Cl.
CPC ........... F25B 9/04 (2013.01); B60H 1/00821 (2013.01); B64D 13/02 (2013.01); *B64D 2013/003* (2013.01)

(58) Field of Classification Search
CPC ..... F25B 9/04; B60H 1/00821; B60H 1/3407; B60H 1/3457; B60H 2001/3485; B64D 13/02; B64D 13/06; B64D 2013/003; F24F 2013/0612; F24F 2221/46
See application file for complete search history.

(56) References Cited

U.S. PATENT DOCUMENTS

| 2,819,590 | A | * | 1/1958 | Green ................... B64D 13/06 |
| | | | | 62/5 |
| 3,630,040 | A | | 12/1971 | Goldfarb |
| 5,205,126 | A | | 4/1993 | Schnurr et al. |
| 5,901,572 | A | | 5/1999 | Peiffer et al. |
| 8,099,966 | B2 | | 1/2012 | Mossberg et al. |
| 9,599,372 | B2 | * | 3/2017 | Bancroft .................. F25B 9/04 |
| 2002/0062650 | A1 | * | 5/2002 | Dukhan ............. H05K 7/20145 |
| | | | | 62/5 |

(Continued)

FOREIGN PATENT DOCUMENTS

| FR | 2560829 B1 | 6/1988 |
| GB | 718143 A | 11/1954 |

(Continued)

OTHER PUBLICATIONS

Extended Search Report for European Application No. 20181626.1 dated May 18, 2021, 8 pages.

*Primary Examiner* — Emmanuel E Duke
(74) *Attorney, Agent, or Firm* — Suiter Swantz pc llo (57) ABSTRACT

A temperature control system in an aircraft passenger service unit is disclosed. In embodiments, the system includes a swirl chamber configured to receive an inlet air stream, and a vortex tube configured to receive the inlet air stream from the swirl chamber and separate the inlet air stream into a warmer air stream and a cooler air stream. In embodiments, the system further includes a nozzle configured to direct a temperature-controlled air stream into a passenger space of an aircraft; wherein the nozzle is configured to be selectably adjusted in order to selectively blend the warmer air stream and the cooler air stream in order to generate the temperature-controlled air stream.

7 Claims, 8 Drawing Sheets

(56) References Cited

U.S. PATENT DOCUMENTS

| | | | |
|---|---|---|---|
| 2009/0241555 | A1 | 10/2009 | Serre |
| 2014/0123978 | A1 | 5/2014 | Bancroft et al. |
| 2016/0298877 | A1* | 10/2016 | So ............................ F25B 9/04 |
| 2019/0154799 | A1* | 5/2019 | Schmidt .................. G01S 7/481 |

FOREIGN PATENT DOCUMENTS

| | | |
|---|---|---|
| GB | 762970 A | 12/1956 |
| GB | 904252 A | 8/1962 |
| KR | 101940004 B1 | 1/2019 |
| RU | 2647392 C1 | 3/2018 |
| WO | 9961269 A3 | 12/1999 |
| WO | 2007064243 A1 | 6/2007 |
| WO | 2008049054 A1 | 4/2008 |
| WO | 2017074282 A1 | 5/2017 |

* cited by examiner

TEMPERATURE CONTROL SYSTEM IN A PASSENGER SERVICE UNIT

BACKGROUND

The options for passengers to control the local ambient environment on commercial aircraft are limited. Typically, a passenger can control their local environment by accessing the overhead nozzle in the passenger service unit (PSU). The passenger can control the amount and direction of air flow by manipulation of the overhead nozzle. The passenger is not, however, able to control the temperature of the air flow from the nozzle. Therefore, there exists a need in the art for a system which cures one or more of the shortfalls of previous approaches identified above.

SUMMARY

A temperature control system in an aircraft passenger service unit is disclosed. In embodiments, the system includes a swirl chamber configured to receive an inlet air stream, and a vortex tube configured to receive the inlet air stream from the swirl chamber and separate the inlet air stream into a warmer air stream and a cooler air stream. In embodiments, the system further includes a nozzle configured to direct a temperature-controlled air stream into a passenger space of an aircraft; wherein the nozzle is configured to be selectably adjusted in order to selectively blend the warmer air stream and the cooler air stream in order to generate the temperature-controlled air stream.

In some embodiments of the system, the nozzle is configured to receive two or more air streams from the vortex tube.

In some embodiments of the system, the nozzle is configured to be selectively adjusted in order to: selectively decrease an air flow rate of the temperature-controlled air stream into the passenger space; selectively increase an air flow rate of the temperature-controlled air stream into the passenger space; selectively control a direction of airflow of the temperature-controlled air stream; and selectively blend the cooler air stream and the warmer air stream to generate the temperature-controlled air stream of a desired temperature.

In some embodiments of the system, the nozzle is selected from the group consisting of a multi-gas nozzle, eductor nozzle, spillback nozzle, solid stream nozzle, hollow cone nozzle, full cone nozzle, screw nozzle, air amplifier nozzle, air edge nozzle, co-annular nozzle or an air jet nozzle.

In some embodiments of the system, the vortex tube is fluidically coupled with a flow tube.

In some embodiments of the system, the vortex tube and the fluidically coupled flow tube are insulated.

In some embodiments of the system, the system further includes a second vortex tube.

In some embodiments of the system, the system further includes a valve configured to control a flow rate of the inlet air stream into the vortex tube.

In some embodiments of the system, the valve is controlled by selectively adjusting the nozzle.

In some embodiments of the system, the valve is selected from the group consisting of a solenoid valve, two-way solenoid valve, three-way solenoid valve, globe valve, ball valve, wafer valve, butterfly valve, plug valve, slow acting valve, slide valve, pilot valve, relieving valve, wedge valve, notched ball valve, needle valve, pneumatic valve, two-way directional pneumatic valve, or a three-way directional pneumatic valve.

In some embodiments of the system, the valve is configured to: receive the inlet air stream from an air compressor; direct a first portion of the inlet air stream to a first vortex tube; and direct a second portion of the inlet air stream to a second vortex tube, wherein the first portion of the inlet air stream and the second portion of the inlet air stream air are blended by selectively adjusting the nozzle in the passenger service unit.

In some embodiments of the system, the vortex tube includes an inner air passageway and an outer air passageway.

In some embodiments of the system, the inner air passageway and the outer air passageway are fluidically coupled.

In some embodiments of the system, the inner air passageway is configured to: receive the air inlet stream; direct the air inlet stream within the inner air passageway to a conical nozzle configured to separate the air inlet stream into a warmer air stream and a cooler air stream, wherein the conical nozzle directs the warmer air stream around the conical nozzle into the outer air passageway towards the nozzle, and directs the cooler air stream through the inner air passageway towards the nozzle, wherein the warmer air stream and the cooler air stream are blended by selectively adjusting the nozzle.

A method for generating a temperature-controlled air stream with a passenger service unit of an aircraft cabin is disclosed. In embodiments, the method includes: generating a compressed inlet air stream with an air compressor; receiving the compressed air inlet stream with a swirl chamber; directing the compressed air inlet stream from the swirl chamber to a conical nozzle disposed within a vortex tube; separating the compressed air inlet stream into a warmer air stream and a cooler air stream with the conical nozzle; directing at least one of the warmer air stream and the cooler air stream to a nozzle; and directing a temperature-controlled air stream into a passenger space of an aircraft with the nozzle, wherein the nozzle is configured to be selectively adjusted in order to selectively blend the warmer air stream and the cooler air stream in order to generate the temperature-controlled air stream.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, directional terms such as "top," "bottom," "over," "under," "upper," "upward," "lower," "down," "downward," and similar terms, are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of present disclosure are directed to temperature control in a PSU system in an aircraft. More particularly, embodiments of the present disclosure are directed to a temperature control system embedded in a PSU that can be manipulated (e.g., selectively actuated, selectively adjusted) by a passenger to control the temperature of the air flow coming out of the overhead vent. Further embodiments of the present disclosure are directed to a system based on a vortex tube which can be integrated into a PSU that separates cabin air into hot and cold streams of air.

It is contemplated herein that the temperature control system of the present disclosure may provide a number of advantages over conventional air vent nozzles in PSUs. First, a passenger can control the temperature of the air coming out of the air nozzle, not just the air flow. This may lead to an increased level of comfort for the passenger. Additionally, each passenger in the cabin can control their own local heating or cooling. This reduces the need for mass conditioning of the larger cabin environment resulting in more efficient operation of the aircraft. The temperature control system has no moving parts (other than the passenger manipulated nozzle), electricity or refrigerant and uses cabin air that is separated into cold and hot streams of air.

Referring generally to FIGS. 1A-4C, a temperature control system in a PSU is described, in accordance with example embodiments of the present disclosure.

Figure 1:
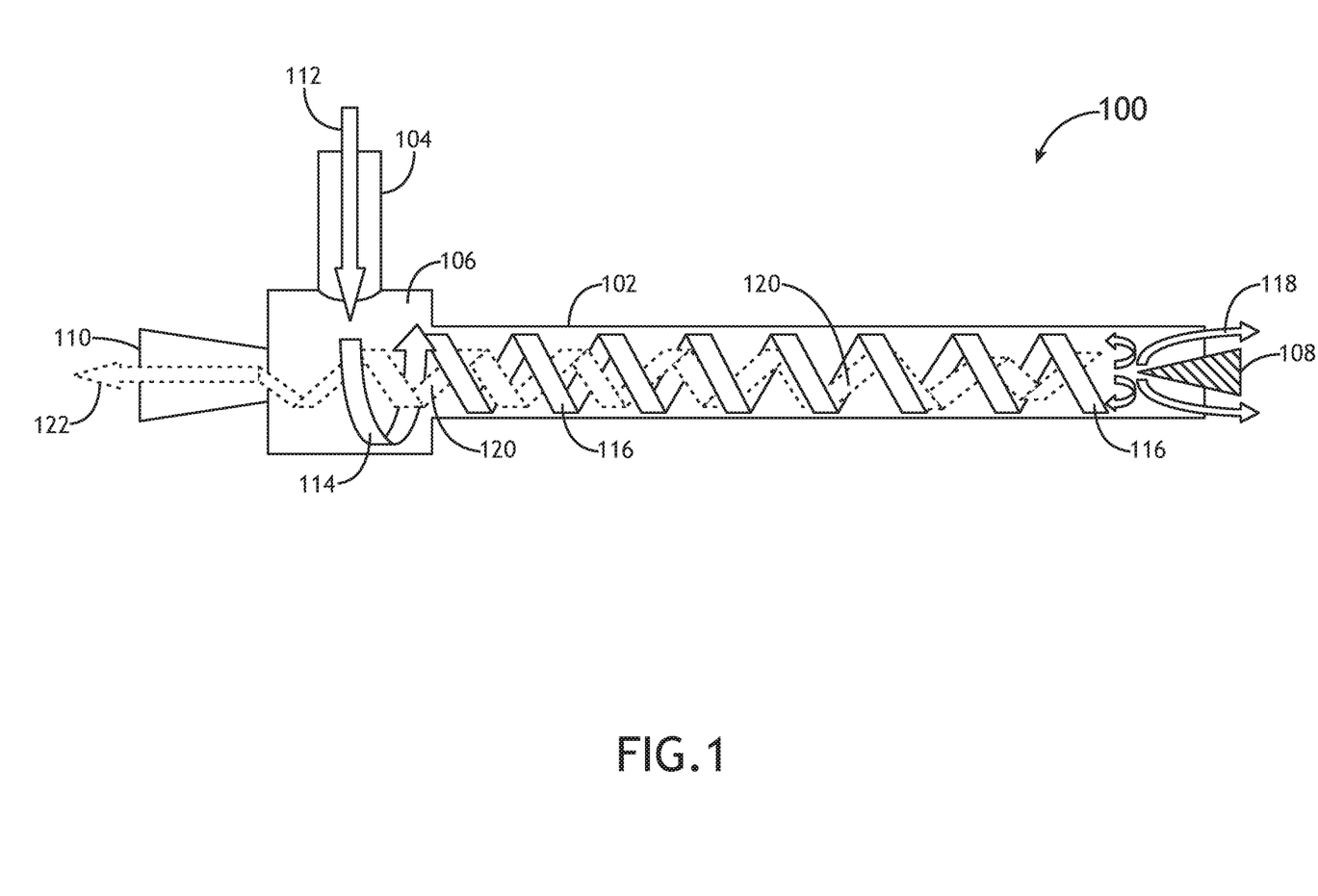
FIG. 1 illustrates a cross-sectional view of a vortex tube.

FIG. 1 illustrates a cross-sectional view of a vortex tube 100. It is noted herein that vortex tube 100 is presented to generally illustrate the physical principles by which the temperature control system described herein is based on such that the inventive concepts of the present disclosure may be more clearly understood.

Vortex tube 100 is a device that separates compressed gas into hot and cold streams of gas. A conventional vortex tube 100 includes a tube 102 with an air inlet 104, a swirl chamber 106, a conical nozzle 108 on one end of the tube 102, and an air outlet 110 on an opposite end of the tube 102.

In operation, a compressed air stream 112 is injected tangentially into the swirl chamber 106. Air stream 112 is accelerated to a high rate of rotation in the swirl chamber. The larger diameter, outer shell of air 116 rotating at the higher speed with a higher temperature travels along the length of tube 102 and escapes through the conical nozzle 108 located at one end of tube 102 as a warmer air stream 118. The inner vortex of air 120 with smaller diameter and of cooler temperature is forced to the opposite end of tube 102 where air 120 exits outlet 110 as a cooler air stream 122. The inner vortex of air 120 and outer vortex of air 116 flow in opposite directions in a counterflow manner within vortex tube 100. This phenomenon is the basis of the inventive concepts disclosed herein. Tube 102, inlet 104, swirl chamber 106, conical nozzle 108 and air outlet 110 are generally fluidically coupled.

Figure 2:
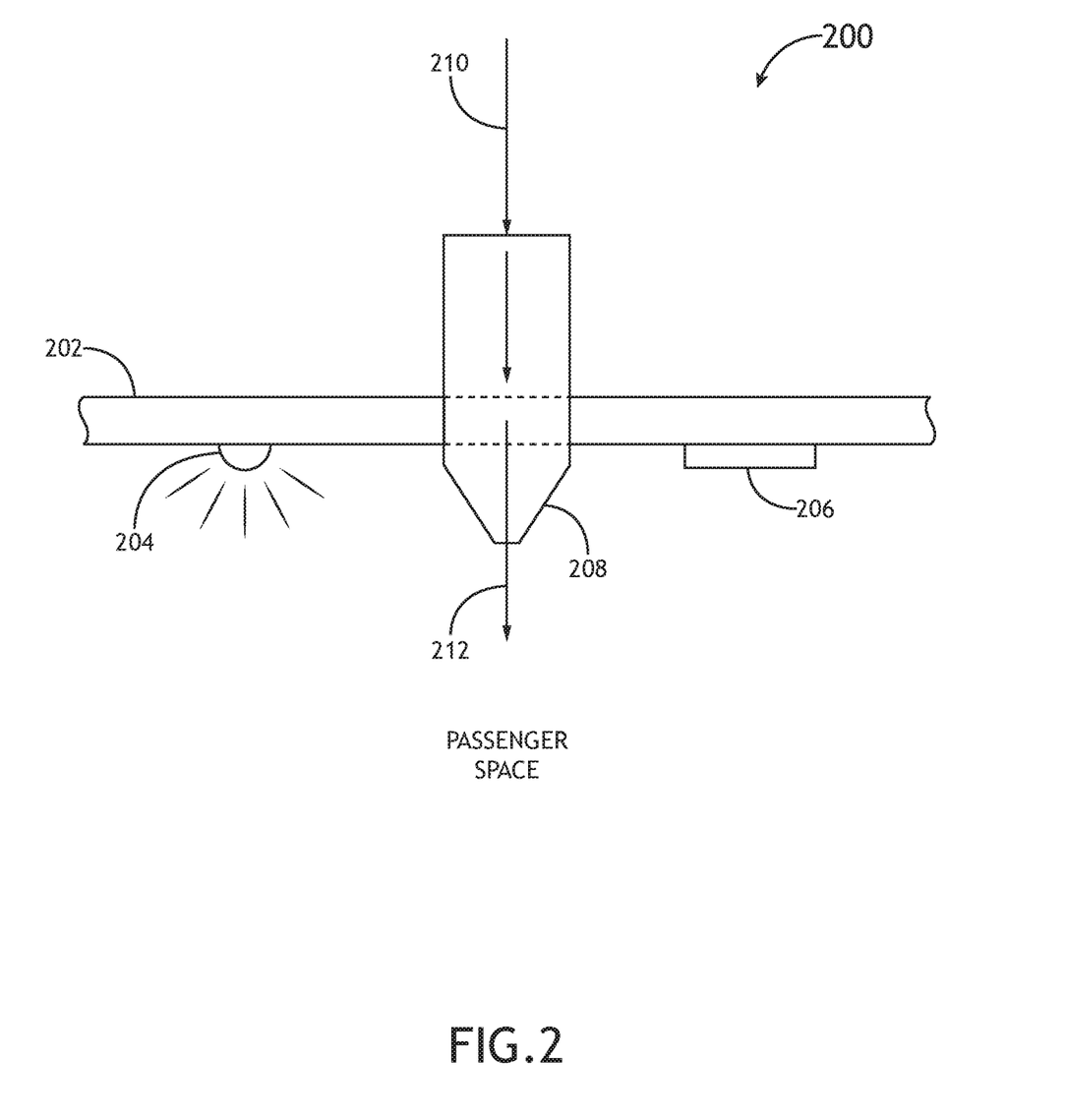
FIG. 2 illustrates a cross-sectional view of a portion of a conventional nozzle system in a passenger service unit (PSU).

FIG. 2 illustrates a cross-sectional view of a portion of a conventional nozzle system in a passenger service unit (PSU). The conventional PSU 200 in FIG. 2 is described for comparative illustration to the embodiments described herein. PSU 200 may include a substrate 202 that supports and is embedded with various functionalities accessible by a passenger in a passenger space in an aircraft cabin. PSU 200 may further include a light 204, an emergency call button 206 and an air nozzle 208. A PSU may include other functionalities not shown in FIG. 2.

Nozzle 208 directs inlet air 210 that enters in the space above the PSU 200. Nozzle 208 is typically capable of being manipulated or selectively adjusted by a passenger. For example, nozzle 208 may be directional such that a passenger may control the direction of inlet air 210 that enters and exits nozzle 208 as exiting air 212. Additionally, a passenger can typically control (e.g., selectively adjust) the amount of flow of exiting air 212. A passenger can selectively increase and/or decrease the air flow rate to the passenger space. For example, the nozzle may be configured to be selectively adjusted in order to selectively decrease or completely shut off the flow of exiting air 212, selectively increase or completely open the flow of exiting air 212 or somewhere in between. The amount of flow of exiting air 212 (air flow rate) depends on the passenger's desired comfort. The flow of exiting air 212 is controlled by manipulation of nozzle 208. A common air nozzle design is a screw nozzle commonly equipped in PSUs. As the passenger turns the nozzle 208 head in a clockwise manner, the nozzle 208 gradually closes and decreases or completely shuts off the exiting air 212 flow to the passenger space. The nozzle 208 head can be turned in a counter-clockwise manner to selectively increase and open the nozzle 208 and increase the flow of exiting air 212. A passenger though cannot control the actual temperature of inlet air 210 that is emitted into the passenger space, only the flow rate.

Figure 3A:
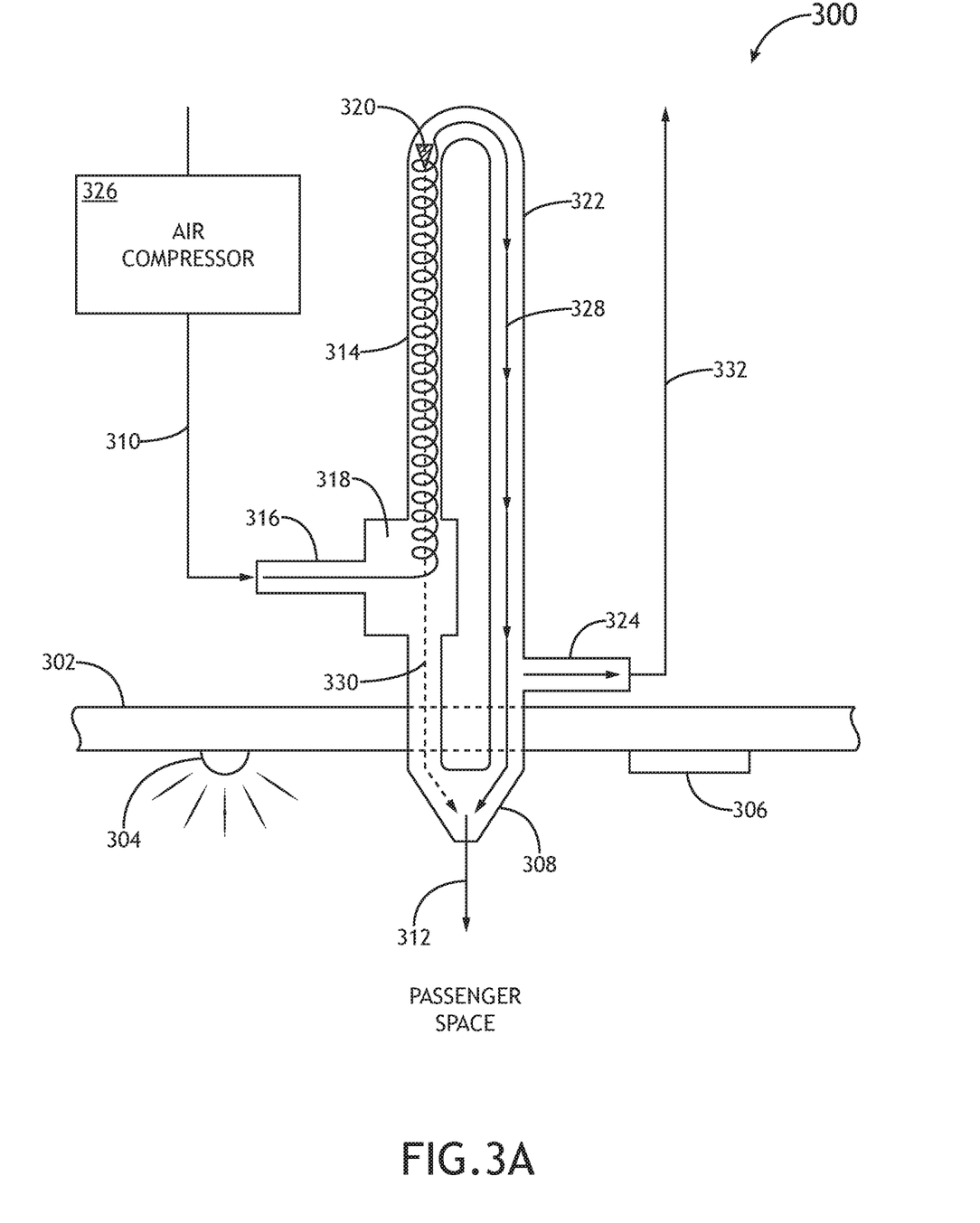
FIG. 3A illustrates a cross-sectional view of a portion of a PSU including a nozzle equipped with a vortex tube, in accordance with one or more embodiments of the present disclosure.

FIG. 3A illustrates a cross-sectional view of a portion of a PSU including a nozzle equipped with a vortex tube, in accordance with one or more embodiments of the present disclosure.

In embodiments, PSU 300 may be configured to be disposed in a passenger space. In an embodiment, PSU 300 includes a substrate 302, a light 304, an emergency call button 306, a nozzle 308, vortex tube 314, air inlet 316, swirl chamber 318, conical nozzle 320, air flow tube 322, and exhaust air outlet 324. In some embodiments, PSU 300 may further include an air compressor 326 to compress inlet air stream 310 for more efficient and effective operation of vortex tube 314 to separate inlet air 310 into cooler and warmer air streams. In embodiments, vortex tube 314 may be continuous with air flow tube 322. In some embodiments, vortex tube 314 may be fluidically coupled with air flow tube 322. In other embodiments, vortex tube 314 may be fluidically coupled to air flow tube 322 by a U-shaped tube as illustrated in FIG. 3A. Nozzle 308, vortex tube 314, air inlet 316, swirl chamber 318, conical nozzle 320, air flow tube 322, and exhaust outlet 324 may be fluidically coupled.

In operation, a compressed air stream 310 is injected into and received by air inlet 316 and into swirl chamber 318. The air is directed in an upward direction towards conical nozzle 320 where the warmer air stream 328 passes around conical nozzle 320 towards flow tube 322. The warmer air stream 328 (solid line) passes through the U-shaped tube into flow tube 322 towards nozzle 308. The cooler air stream 330 (dotted line) moves downwards towards swirl chamber 318 and onward towards nozzle 308. A passenger may then selectively adjust nozzle 308 in such a way as to blend the cool air stream 330 and warm air stream 328 to attain a desired temperature of temperature-controlled air stream 312 to be allowed into the passenger space. A passenger may also selectively adjust the nozzle 308 in order to adjust an air flow rate of the temperature-controlled air stream 312 entering the passenger space. For example, a passenger may completely shut off the flow of any air stream into the passenger space by selectively decreasing and completely closing the nozzle or selectively increasing and completely open up the nozzle to allow all air to flow out. Any unused air during blending or if the passenger completely closes nozzle 308, may exit out exhaust outlet 324 as exhausted air stream 332. In other embodiments, a passenger may also control the flow rate of temperature-controlled air stream 312.

Figure 3B:
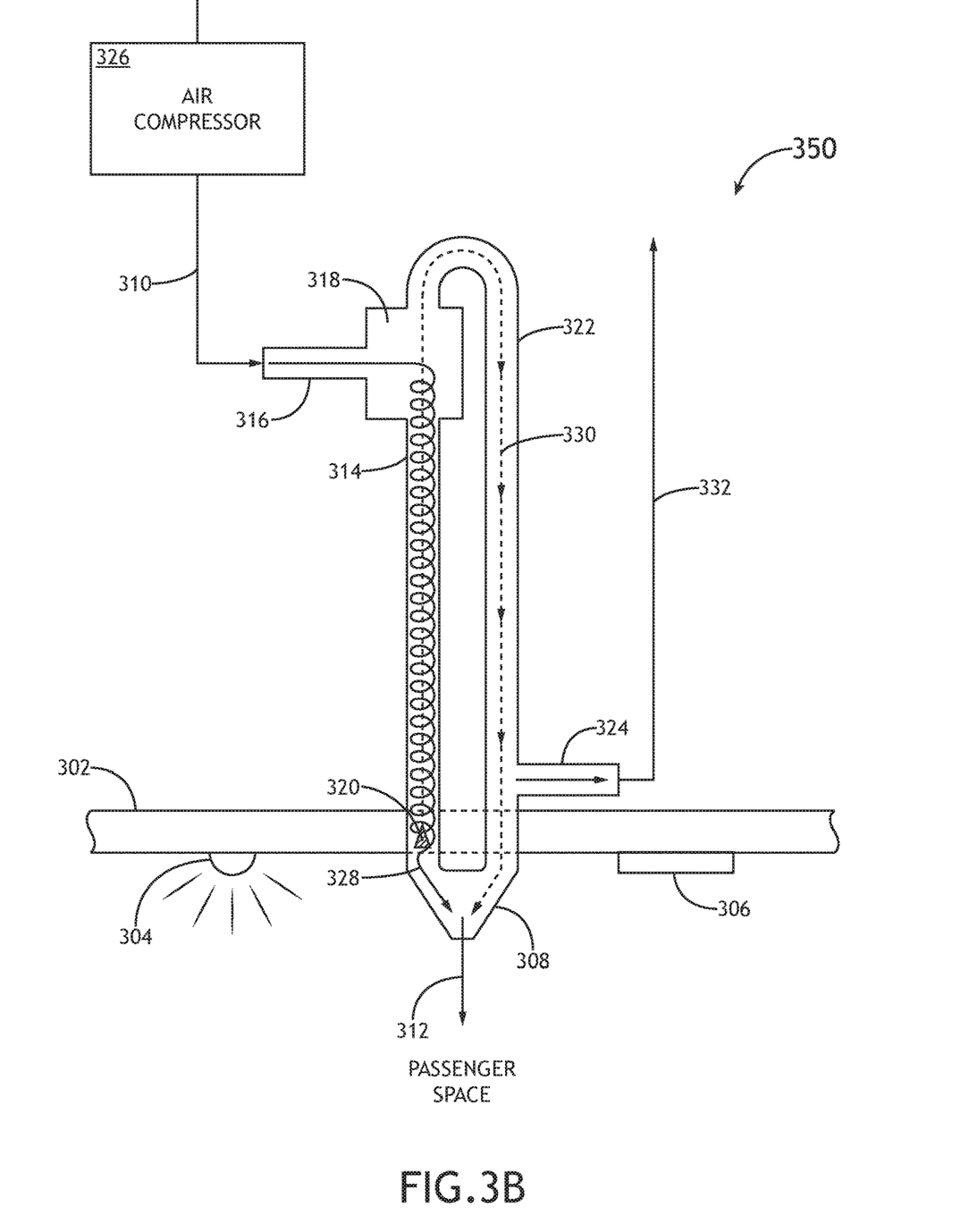
FIG. 3B illustrates a cross-sectional view of a portion of a PSU including a nozzle equipped with a vortex tube, in accordance with one or more embodiments of the present disclosure.

FIG. 3B illustrates a cross-sectional view of a portion of a PSU including a nozzle equipped with a vortex tube, in accordance with one or more embodiments of the present disclosure.

In embodiments, PSU 350 is configured to be disposed in a passenger space in an aircraft. In an embodiment, PSU 350 includes a nozzle 308, a vortex tube 314, an air inlet 316, a swirl chamber 318, a conical nozzle 320, a flow tube 322 and an exhaust outlet 324. In this embodiment, vortex tube 314 is reversed in comparison to PSU embodiment 300 in FIG. 3A. In PSU 350, air inlet 316 is toward the top and nearest the U-shaped tube bend and air flow tube 322. In embodiments, vortex tube 314 may be continuous with air flow tube 322. In some embodiments, vortex tube 314 may be fluidically coupled with air flow tube 322. In other embodiments, vortex tube 314 may be fluidically coupled with air flow tube 322 by a U-shaped tube as illustrated in FIG. 3B. In some embodiments, PSU 350 may further include an air compressor 326 to compress inlet air stream 310. Nozzle 308, vortex tube 314, air inlet 316, swirl chamber 318, conical nozzle 320, air flow tube 322, and air exhaust outlet 324 may be fluidically coupled.

In operation, a compressed inlet air stream 310 is injected into and received by air inlet 316 and into swirl chamber 318. The air is directed in a downward direction towards conical nozzle 320 where the warmer air stream 328 (solid line) passes around conical nozzle 320 towards nozzle 308. The cooler air stream 330 (dotted line) moves upwards towards swirl chamber 318, into U-shaped tube bend and flow tube 322. The cooler air stream 330 then flows onward towards nozzle 308. The passenger may manipulate nozzle 308 in such a way as to selectively blend the cooler air stream 330 and warmer air stream 328 to attain a desired temperature of a temperature-controlled air stream 312 that is released into the passenger space. Any unused air during blending or if the passenger completely closes nozzle 308, may exit out exhaust outlet 324 as exhausted air stream 332. In other embodiments, the passenger may also control the flow rate of the temperature-controlled air stream 312 that is released into the passenger space.

Figure 3C:
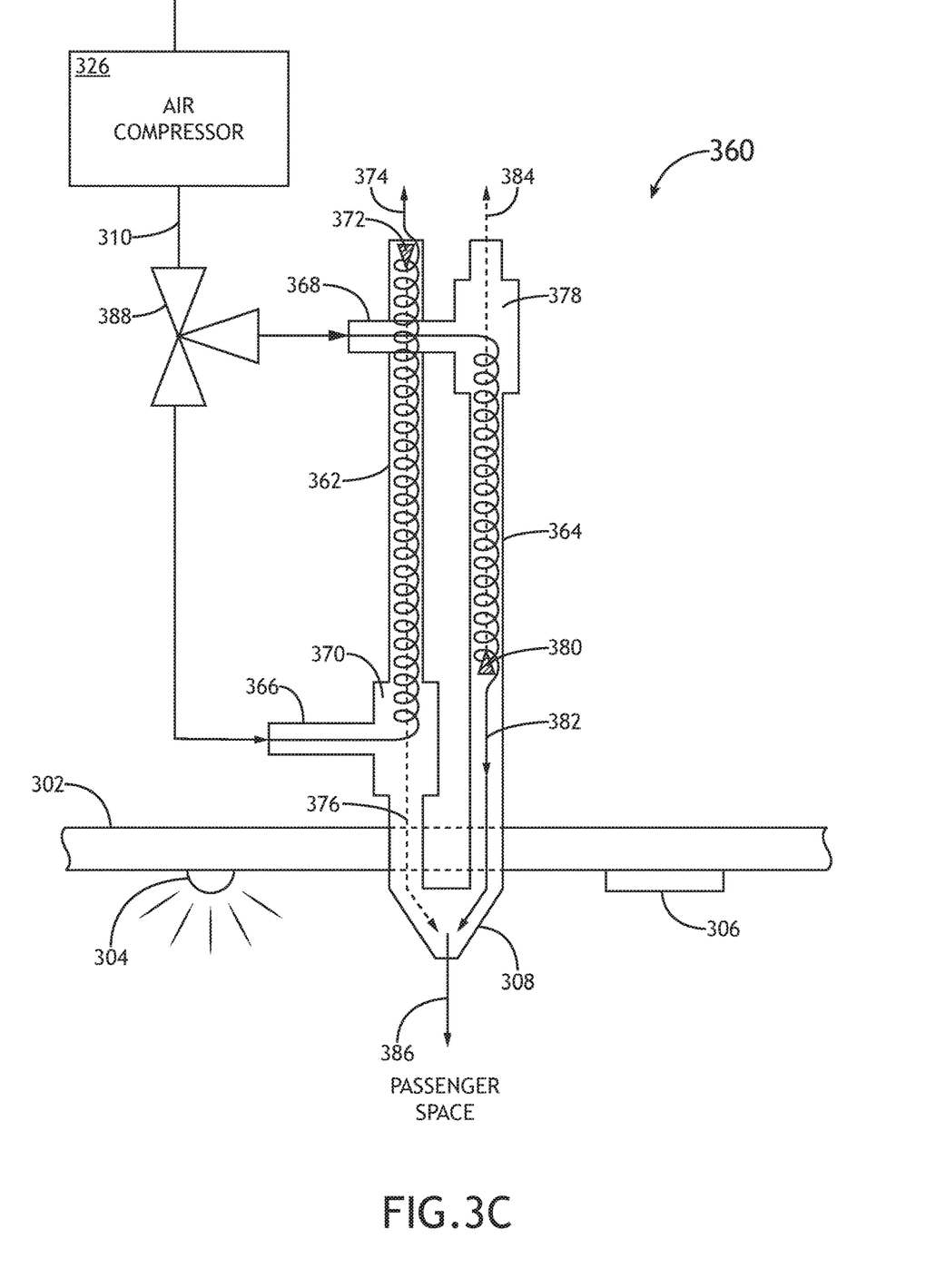
FIG. 3C illustrates a cross-sectional view of a portion of a PSU including a nozzle equipped with a first vortex tube and second vortex tube, in accordance with one or more embodiments of the present disclosure.

FIG. 3C illustrates a cross-sectional view of a portion of a PSU 360 including a nozzle 308 equipped with a first vortex tube 362 and a second vortex tube 364, in accordance with one or more embodiments of the present disclosure.

In embodiments, PSU 360 may be configured to be in a passenger space in an aircraft. In an embodiment, PSU 360 includes a first vortex tube 362 and a second vortex tube 364. Generally, first vortex tube 362 and second vortex tube 364 are fluidically coupled. This contrasts with embodiments 300, 350 illustrated in FIGS. 3A-3B that include a single vortex tube 314. Vortex tubes 362, 364 in PSU 360 may be arranged in an opposing manner wherein the air inlet 366 for first vortex tube 362 is arranged near nozzle 308 and air inlet 368 of second vortex tube 364 is arranged away from nozzle 308. The embodiment in FIG. 3C shows air inlets 366, 368 are arranged to receive compressed air to the left of first vortex tube 362. In other embodiments, air inlet 368 may be facing the opposite direction of inlet 366 such that air inlets 366, 368 may receive compressed air from opposing directions. Vortex tubes 362, 364, air inlets 366, 368, swirl chambers 370, 378 and conical nozzles 372, 380 may be fluidically coupled. In some embodiments, PSU 360 may further include an air compressor 326 to compress inlet air stream 310.

In dual vortex tube operation, a compressed inlet air stream 310 is injected and received simultaneously into air inlet 366 and swirl chamber 370 of first vortex tube 362 and air inlet 368 and swirl chamber 378 of second vortex tube 364. Air that enters inlet 366 of first vortex tube 362 flows in an upward manner towards conical nozzle 372 where the warmer air stream 374 flows out of vortex tube 362. The cooler air stream 376 of first vortex tube 362 flows in a downward manner towards nozzle 308. Air that enters inlet 368 and swirl chamber 378 of second vortex tube 364 flows in a downward manner towards conical nozzle 380. The warmer air stream 382 passes around conical nozzle 380 and onwards towards nozzle 308. The cooler air stream 384 flows upward towards swirl chamber 378 and exits vortex tube 364. A passenger may then be able to control the temperature of the temperature-controlled air stream 386 by selectively adjusting nozzle 308 in a way to selectively decrease and/or shut off the flow or blend warmer air stream 382 and cooler air stream 376 to a desired temperature to be released into the passenger space. In other embodiments, a passenger may also control the flow rate of temperature-controlled air stream 386 released into the passenger space.

In some embodiments, PSU 360 may further include a valve 388. For example, valve 388 may be a three-way valve as illustrated in FIG. 3C. Valve 388 may be operated by a control device accessible by a passenger near nozzle 308. Valve 388 may be used to control the temperature of the temperature-controlled air stream 386 released into the passenger space. Valve 388 may be selected from the group consisting of a solenoid valve, two-way solenoid valve, three-way solenoid valve, globe valve, ball valve, wafer valve, butterfly valve, plug valve, slow acting valve, slide valve, pilot valve, relieving valve, wedge valve, notched ball valve, needle valve, pneumatic valve, two-way directional pneumatic valve or a three-way directional pneumatic valve.

In operation, compressed inlet air stream 310 may enter valve 388. Depending on the desired temperature of air stream 386 by the passenger, a valve 388 may allow inlet air stream 310 to pass into inlets 366 of the first vortex tube 362 and air inlet 368 of second vortex tube 364 substantially equally. This may lead to a relatively moderate temperature level of temperature-controlled air stream 386.

In some situations, a passenger may desire a colder air stream exiting from the nozzle 308. In this situation, valve 388 may be controlled by a passenger to close off air flow to inlet 368 of second vortex tube 364. This shuts off the warmer air stream 382 from the second vortex tube 364 and allows cooler air stream 376 from first vortex tube 362 to enter nozzle 308 and exit as temperature-controlled air stream 386 into the passenger space.

In some situations, a passenger may desire a warmer air stream exiting from the nozzle 308. In this situation, valve 388 may be controlled by a passenger to close off air flow to inlet 366 of first vortex tube 362. This shuts off the cooler air stream 376 from the first vortex tube 362 and allows warmer air stream 382 from the second vortex tube 364 to enter nozzle 308 and exit as temperature-controlled air stream 386 into the passenger space.

In some embodiments, PSU 360 may include three or more vortex tubes. In some embodiments, nozzle 308 may be configured to receive two or more air streams. The two or more air streams may be of different temperatures.

Figure 4A:
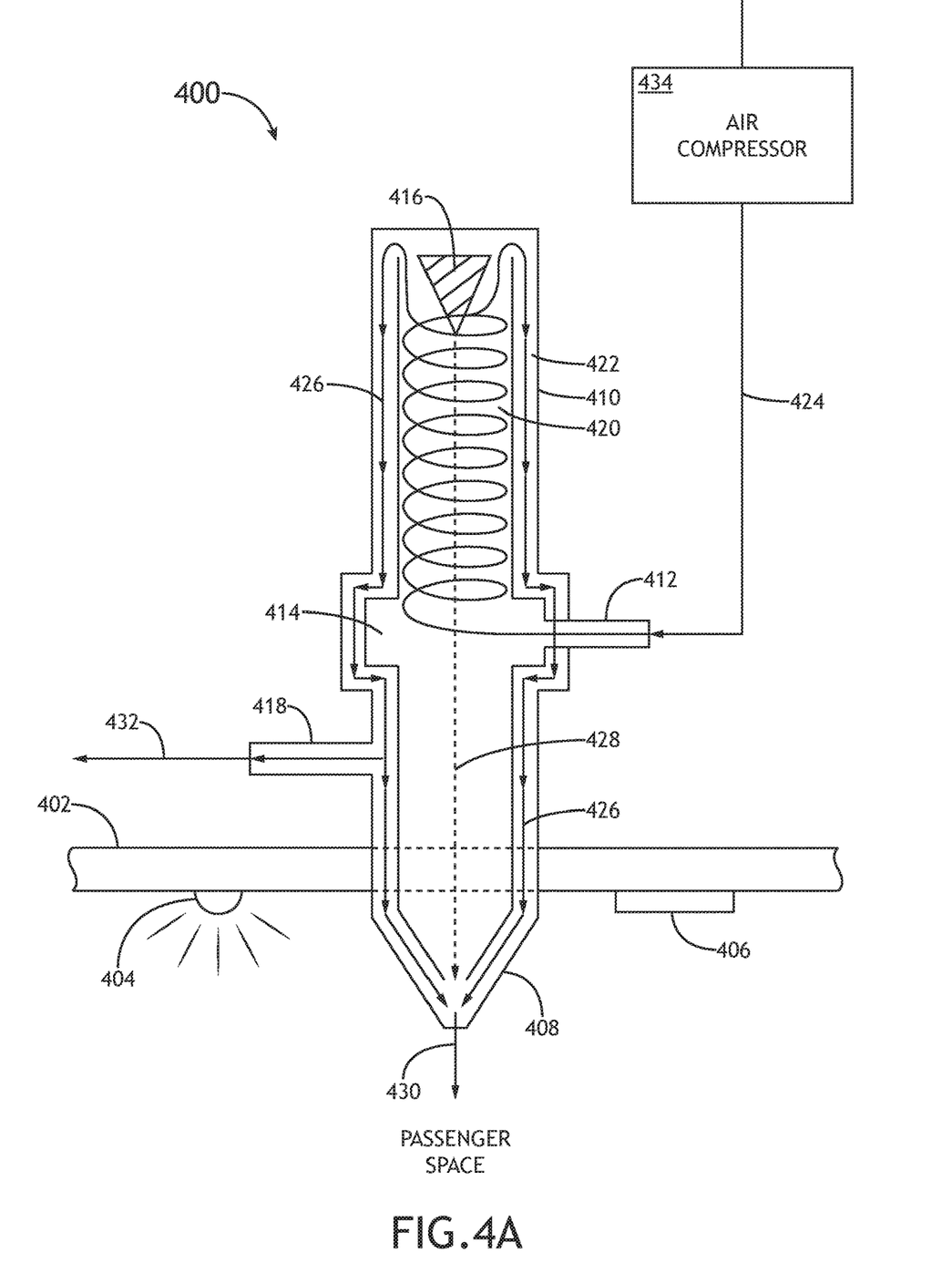
FIG. 4A illustrates a cross-sectional view of a portion of a PSU including a nozzle equipped with a vortex tube, in accordance with one or more embodiments of the present disclosure.

FIG. 4A illustrates a cross-sectional view of a portion of a PSU including a nozzle equipped with a vortex tube, in accordance with one or more embodiments of the present disclosure.

In some embodiments, PSU 400 includes a substrate 402 that supports and is embedded with various functionalities accessible by a passenger in a passenger space in an aircraft cabin. PSU 400 may include a light 404, an emergency call button 406 and an air nozzle 408. PSU 400 may include other functionalities not shown in FIG. 4A. Nozzle 408 directs air that enters in the space above PSU 400. Nozzle 408 is typically capable of being manipulated by a passenger. For example, nozzle 408 may be directional such that a passenger may control the direction of air that enters and exits nozzle 408 and into the passenger space. Additionally, a passenger may also control the amount of flow of air exiting nozzle 408 and into the passenger space.

In embodiments, PSU 400 includes a vortex tube 410, an air inlet 412, a swirl chamber 414, a conical nozzle 416 and an exhaust air outlet 418. The vortex tube 410 further includes an inner air passageway 420 and an outer air passageway 422. In an embodiment, outer air passageway 422 surrounds inner air passageway 420. In some embodiments, PSU 400 may further include an air compressor 434. In some embodiments, inner air passageway 420 is fluidically coupled with outer air passageway 422 as illustrated in PSU embodiment 400 in FIG. 4A. Vortex tube 410, nozzle 408, air inlet 412, swirl chamber 414, conical nozzle 416, exhaust air outlet 418, inner air passageway 420 and outer air passageway 422 may be fluidically coupled.

In operation, compressed air 424 is injected into and received by the air inlet 412 and enters the swirl chamber 414. The air is directed in an upward manner towards the conical nozzle 416. The outer shell of warmer air 426 passes around the conical nozzle 416 and exits inner air passageway 420 and enters outer air passageway 422. Warmer air stream 426 (solid line) is forced in a downward direction towards nozzle 408. The inner shell of cooler air 428 (dotted line) is forced in a downward direction in inner air passageway 420 towards nozzle 408. Both the warmer air stream 426 and cooler air stream 428 enters nozzle 408 where a passenger may manipulate and selectively adjust nozzle 408 in such a manner as to selectably blend air streams 426, 428 to regulate the temperature of exiting temperature controlled air 430 into the passenger space. Excess exhaust air 432 may exit the vortex tube 410 out of exhaust outlet 418. If a passenger chooses to selectively decrease and completely shut off nozzle 408, all air from inner air passageway 420 and outer air passageway 422 may exit exhaust outlet 418.

Figure 4B:
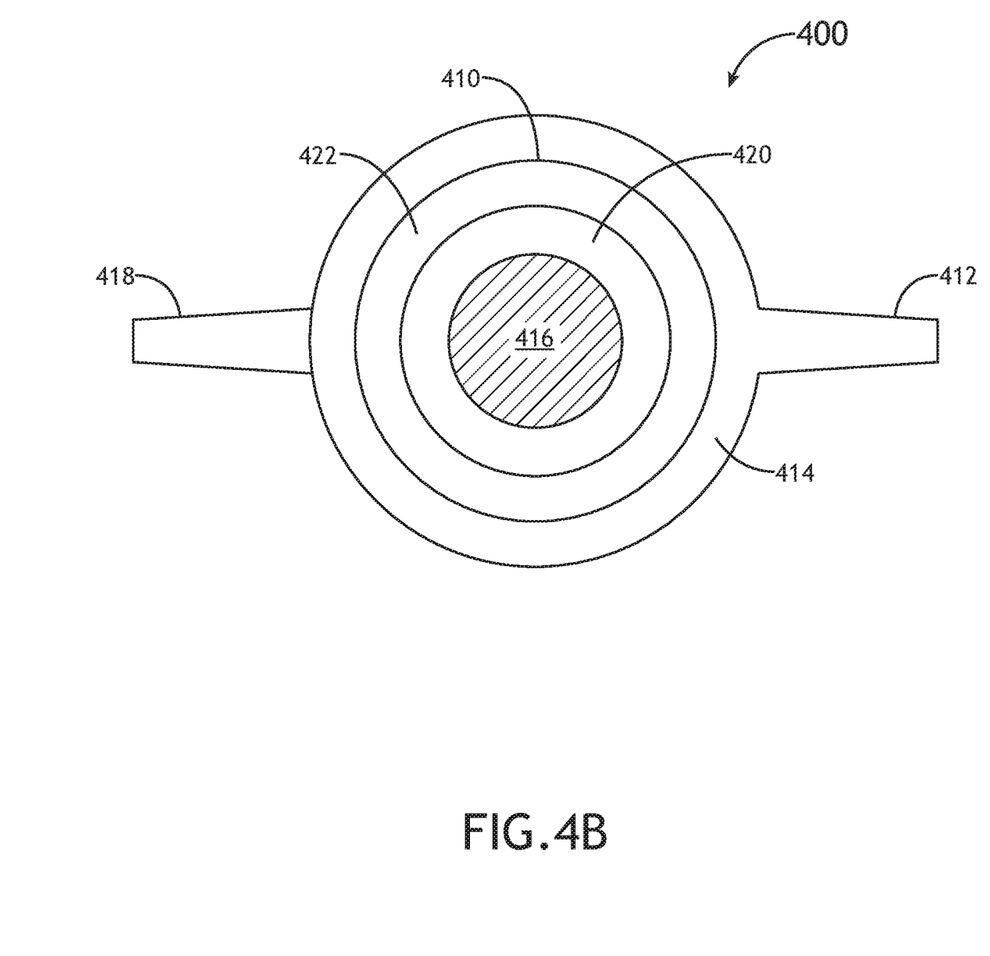
FIG. 4B illustrates a cross-sectional overhead view of vortex tube in PSU, in accordance with one or more embodiments of the present disclosure.

FIG. 4B illustrates a cross-sectional overhead view of vortex tube in PSU, in accordance with one or more embodiments of the present disclosure.

FIG. 4B attempts to more clearly illustrate vortex tube design 410 in PSU embodiment 400. This view looks down on top of the PSU 400 near the conical nozzle 416. FIG. 4B shows a substantially circular vortex tube 410. FIG. 4B further illustrates the inner air passageway 420, the outer air passageway 422, the swirl chamber 414, the air inlet 412 and the exhaust outlet 418. This design shows the air inlet 412 and air outlet 418 on opposing sides of vortex tube 410. In other embodiments, the air inlet 412 and the air outlet 418 may be on the same side. Other designs of the locations of the air inlet 412 and air outlet 418 may be possible depending on the application.

Figure 4C:
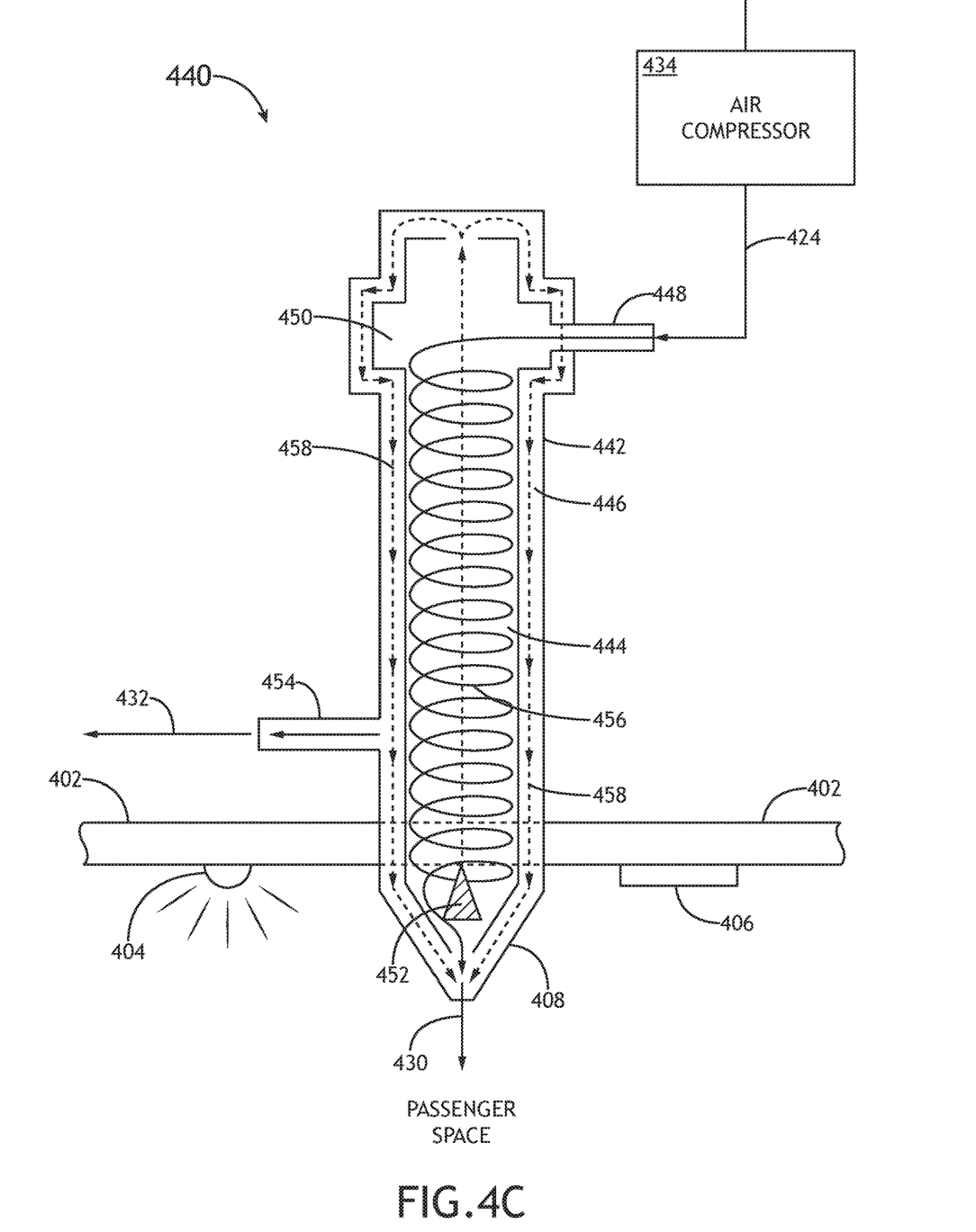
FIG. 4C illustrates a cross-sectional view of a portion of a PSU including a nozzle equipped with a vortex tube, in accordance with one or more embodiments of the present disclosure.

FIG. 4C illustrates a cross-sectional view of a portion of a PSU including a nozzle equipped with a vortex tube, in accordance with one or more embodiments of the present disclosure.

Vortex tube 442 in PSU 440 includes an inner air passageway 444, an outer air passageway 446, a compressed air inlet 448, a swirl chamber 450, a conical nozzle 452 and an exhaust air outlet 454. PSU 440 is similar to embodiment PSU 400 but the air inlet 444 and swirl chamber 450 are located near the top of vortex tube 442. In embodiment PSU 400, the air inlet 412 and swirl chamber 414 are located near the bottom of the vortex tube 410. In some embodiments, inner air passageway 444 is fluidically coupled with outer air passageway 446 as illustrated in the PSU 440. In some embodiments, PSU 440 may further include an air compressor 434. The vortex tube 442, the nozzle 408, the inner air passageway 444, the outer air passageway 446, the air inlet 448, the swirl chamber 450, the conical nozzle 452 and the exhaust air outlet 454 may be fluidically coupled.

In operation, compressed air 424 is injected into and received by the air inlet 448 and enters the swirl chamber 450. Inlet air 424 is directed in a downward manner towards the conical nozzle 452. The outer shell of warmer air 456 (solid line) passes around the conical nozzle 452 towards nozzle 408. The cooler air stream 458 (dotted line) is forced upward where the cooler air stream 458 exits inner air passageway 444 and enters outer air passageway 446. The cooler air stream 458 and the warmer air stream 456 flow in opposite directions in a counterflow manner within the vortex tube 442. The cooler air stream 458 is forced in a downward direction towards the nozzle 408. Both the warmer air stream 456 and the cooler air stream 458 enters nozzle 408 where a passenger may manipulate and selectively adjust nozzle 3408 in such a manner as to blend the air streams 456, 458 to regulate the temperature of exiting temperature controlled air 430 that is released into the passenger space. The excess exhaust air 432 may leave the vortex tube 442 out the exhaust outlet 454. If a passenger chooses to completely shut off the nozzle 408, all air from the inner passageway 444 and the outer passageway 446 may exit the exhaust outlet 454.

The embodiments illustrated in FIGS. 3A-4C are depicted as monolithic units that include components necessary to receive inlet air and separate the inlet air into cooler and warmer air streams. The temperature and flow of the air streams may be controlled by a passenger that are released into the passenger space to a desired comfort level. In other embodiments, the units may be modular in design. For example, PSUs comprising conventional systems illustrated in FIG. 2 may be retrofitted with temperature control systems illustrated in embodiments 300, 350, 360, 400 or 440.

In some embodiments, any of the components may be insulated. This may help to retain the temperature of the separated warmer and cooler air streams that exit the nozzle and into the passenger space. This may allow for more efficient operation of a temperature control device in a PSU.

A variety of nozzles may be acceptable for blending of warm and cool air streams and integrated into PSUs comprising a vortex tube. In some embodiments, the nozzle 308, 408 may include a multi-gas nozzle. Nozzle 308, 408 may include one or more of an eductor nozzle, spillback nozzle, solid stream nozzle, hollow cone nozzle, full cone nozzle, screw nozzle, air amplifier nozzle, air edge nozzle, coannular nozzle or an air jet nozzle.

In some embodiments, a single nozzle for use in a PSU comprising a vortex tube may be able to be manipulated and selectively adjusted by a passenger to control the air flow and the temperature of the airflow that is released into the passenger space. In other embodiments, a PSU may include a first nozzle that may be manipulated by a passenger to selectively adjust the temperature of the air flow and a second nozzle that may be manipulated and selectively adjusted by a passenger to control the amount and direction of air flow.

Any of the components in the temperature control systems described herein may be composed of metal, polymer, glass or a combination thereof.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A temperature control system in an aircraft passenger service unit, comprising:
   a swirl chamber configured to receive an inlet air stream;
   a vortex tube configured to receive the inlet air stream from the swirl chamber and separate the inlet air stream into a warmer air stream and a cooler air stream;
   a nozzle configured to direct a temperature-controlled air stream into a passenger space of an aircraft; wherein the nozzle is configured to be selectably adjusted in order to selectively blend the warmer air stream and the cooler air stream in order to generate the temperature-controlled air stream.

2. The system of claim 1, wherein the nozzle is configured to receive two or more air streams from the vortex tube.

3. The system of claim 1, wherein the nozzle is configured to be selectively adjusted in order to:
   selectively decrease an air flow rate of the temperature-controlled air stream into the passenger space;
   selectively increase an air flow rate of the temperature-controlled air stream into the passenger space;
   selectively control a direction of airflow of the temperature-controlled air stream; and
   selectively blend the cooler air stream and the warmer air stream to generate the temperature-controlled air stream of a desired temperature.

4. The system of claim 1, wherein the nozzle is selected from the group consisting of a multi-gas nozzle, eductor nozzle, spillback nozzle, solid stream nozzle, hollow cone nozzle, full cone nozzle, screw nozzle, air amplifier nozzle, air edge nozzle, co-annular nozzle or an air jet nozzle.

5. The system of claim 1, wherein the vortex tube comprises an inner air passageway and an outer air passageway.

6. The system of claim 5, wherein the inner air passageway and the outer air passageway are fluidically coupled.

7. The system of claim 5, wherein the inner air passageway is configured to:
   receive the air inlet stream;
   direct the air inlet stream within the inner air passageway to a conical nozzle configured to separate the air inlet stream into a warmer air stream and a cooler air stream, wherein the conical nozzle directs the warmer air stream around the conical nozzle into the outer air passageway towards the nozzle, and directs the cooler air stream through the inner air passageway towards the nozzle, wherein the warmer air stream and the cooler air stream are blended by selectively adjusting the nozzle.

* * * * *